United States Patent [19]

Gaus

[11] Patent Number: 5,604,406
[45] Date of Patent: Feb. 18, 1997

[54] PORTABLE LAMP FOR USE WITH RAPID START METAL HALIDE BULBS

[75] Inventor: Harry Gaus, Dilsberg, Germany

[73] Assignee: Intermacon AG, Zurich, Switzerland

[21] Appl. No.: 413,139

[22] Filed: Mar. 29, 1995

[51] Int. Cl.[6] ................................................ H05B 37/02
[52] U.S. Cl. ........................ 315/56; 362/80; 362/265; 315/71; 315/200 A
[58] Field of Search ..................... 362/265, 80; 315/56, 315/58, 71, 200 A, 307, 224

[56] References Cited

U.S. PATENT DOCUMENTS

| | | | |
|---|---|---|---|
| 4,992,918 | 2/1991 | Shioiri et al. | 362/368 |
| 5,047,695 | 10/1991 | Allen et al. | 315/224 |
| 5,118,990 | 6/1992 | Makita | 315/82 |
| 5,151,631 | 9/1992 | Oda et al. | 315/82 |
| 5,188,444 | 2/1993 | Makita et al. | 362/80 |

Primary Examiner—Robert Pascal
Assistant Examiner—Michael Shingleton
Attorney, Agent, or Firm—Kenyon & Kenyon

[57] ABSTRACT

A lamp assembly for use with a rapid start metal halide bulb, and including a lamp head housing and a power supply source. The lamp head housing includes a circuit board with power supply contact surfaces, a high voltage resistant socket, a reflector, and an on-off switch. The circuit board provides an ignition voltage, an ignition voltage spike, and a supply voltage to the rapid start metal halide bulb. The power supply contact surfaces connect power to the circuit board. The high voltage resistant socket holds the rapid start metal halide bulb and is electrically coupled with the circuit board. The reflector is arranged relative to the high voltage resistant socket, and reflects light emitted from the rapid start metal halide bulb. The on-off switch is electrically coupled with the circuit board. The power supply source provides an AC or DC power supply and is adapted to be either mechanically coupled with the lamp head housing such that its contacts contact the power supply contact surfaces of the lamp head housing or wire connected to the lamp head housing.

28 Claims, 10 Drawing Sheets

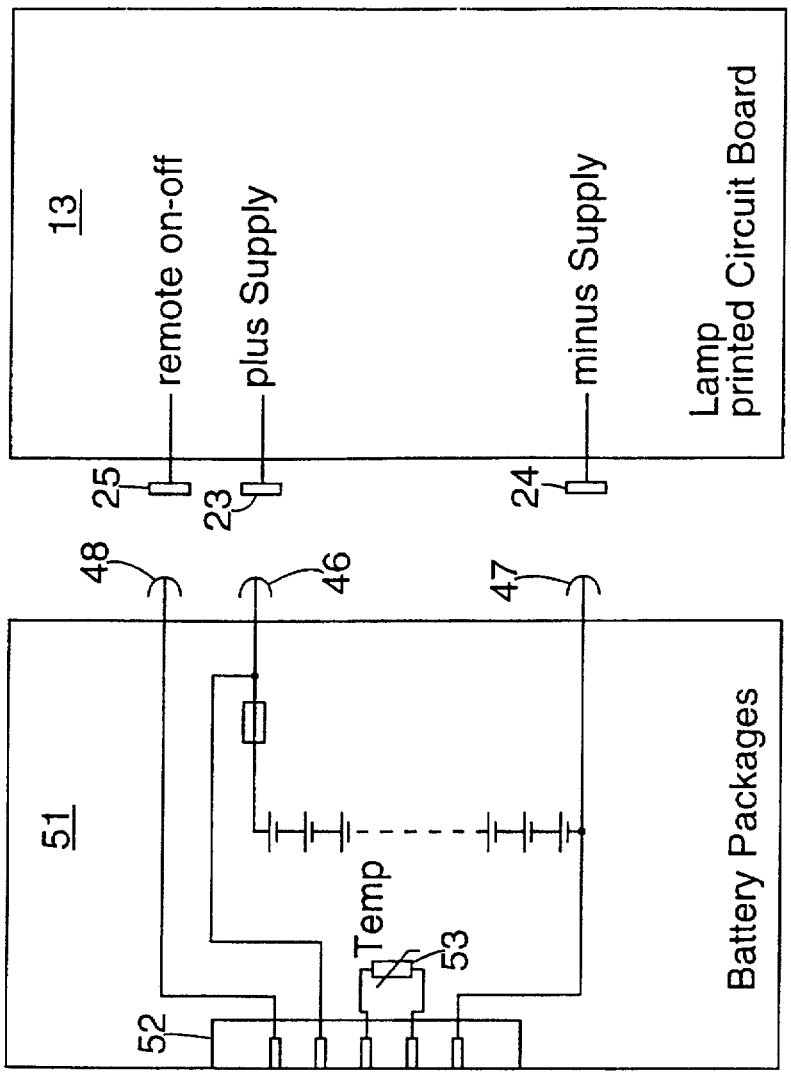
FIG. 8
FIG. 9
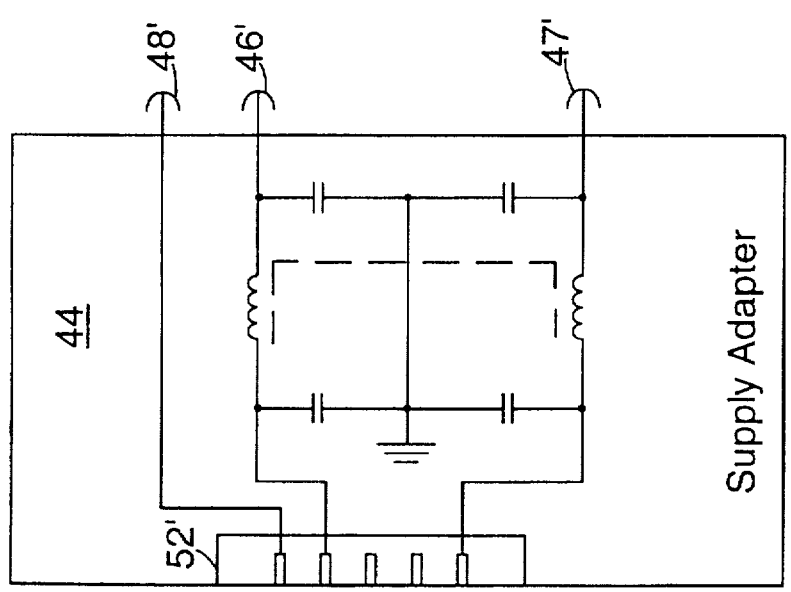
FIG. 10

PORTABLE LAMP FOR USE WITH RAPID START METAL HALIDE BULBS

BACKGROUND OF THE INVENTION

The present invention relates to lamps (stationary or portable) such as hand-held, land vehicle, boat, aircraft, etc., which can be supplied with power from a variety of power sources such as a power grid (i.e., an AC power supply), a renewable energy source, or a disposable energy source, for example, and which can use rapid start metal halide bulbs.

Presently, most portable lamps use conventional glow wire bulbs which are powered by disposable or rechargeable battery cells. Unfortunately, such conventional glow wire bulbs have a low power-to-light conversion efficiency (hereinafter "conversion efficiency"), i.e., electrical energy is converted more to heat than to visible light. Although the bulb's conversion efficiency can be increased by increasing the temperature of the glow wire of the bulb, such a temperature increase rapidly reduces the service life of the bulb. The service life/conversion efficiency relationship can be improved by filling the light bulb with heavy inert gases such as Krypton or Xenon. The light power of such conventional bulbs is typically between 0.7 and 5 watts.

Light bulbs filled with halogen-hydrogen (hereinafter "halogen light bulbs") are advantageous in that they can operate at higher temperatures without suffering an unacceptably low service life. This is due, at least in part, to a "recycling" of the high temperature glow-wire material. Specifically, tungsten from the glow wire deposited on the glass surface of the light bulb migrates back to the glow wire.

Two types of halogen light bulbs are presently available; namely, a longlife halogen light bulb and a high power halogen light bulb. The service life of the longlife halogen light bulbs is on the order of 2000 hours. During operation, the glow wire attains a temperature of approximately 2900°–3000° K. The average light conversion efficiency is 15–20 lumen per watt. The service life of high power halogen light bulbs is about 50 hours. During operation, the glow wire attains a temperature of about 3000°–3300° K. The average light conversion efficiency is 20–30 lumen per watt.

Unfortunately, halogen light bulbs have a number of problems which greatly limit their use in portable or hand held lamps. Specifically, halogen lamps are extremely sensitive to changing power supply voltages. For example, a voltage increase of 5% results in a 14% increase in light output, a 6% increase in conversion efficiency, but a 50% decrease in service life. Further, since resistivity of the tungsten filament decreases with temperature, if a fully charged battery is connected to a cold glow wire, the glow wire may burn off due to the high current. Moreover, at the end of the battery discharge period, the light output and the conversion efficiency are greatly reduced and the "color temperature" is degraded. Lastly, at the end of the service life of a halogen light bulb, unless an internal fuse is employed, a damaging arc can occur.

Halogen is commonly used in light bulbs having a power rating over 2.5 watts. Hand held lamps for professional use are usually equipped with halogen light bulbs rated at between 5 and 35 watts. The 35 watt limit is dictated by the heat loss (of about 28 watts) which must be removed without burning a user. Professional hand held lamps for underwater use (e.g., a diver lamp) can be equipped with bulbs up to 100 watts since the water can remove the extra heat generated. However, for example, a 100 watt lamp requires a heavy (almost 8 pounds) NiCad (Nickel Cadmium) battery for a one hour supply of light. In each of the above examples of halogen lamps, the light output is limited based on the total power rating of the lamp and the conversion efficiency of the lamp.

Metal halide light bulbs have a much higher conversion efficiency than other conventional bulbs, i.e., on the order of 70 to 90 lumen per watt. These light bulbs emit light by ionizing gases. Metal halide light bulbs are high pressure mercury vapor light bulbs filled with heavy metal halogens to improve the "color temperature" of the emitted light. Metal halide light bulbs are typically rated from 35 to 1000 watts. Unfortunately, metal halide light bulbs need from one to three minutes, from the time they are switched on, to reach their full output. Moreover, metal halide light bulbs are difficult to restart under "hot conditions" (i.e., when they have been operating) such as after a short interruption of the power supply.

The development of special metal halide light bulbs has been funded by the European Community/European Union. These special metal halide light bulbs can restart under hot conditions and which quickly attain full light output from the time they are switched on. For example, the bulbs ECE-D1, ECE-D2 or ECE-D2-S (also covered by the German Industrial Standard DIN 72601) have these characteristics. Specifically, these special metal halide light bulbs attain 15% of total output in about 0.5 seconds and full output in about 2 seconds. Their light conversion efficiency is about 85 lumen per watt. Special metal halide light bulbs with 35 to 50 watt power ratings are currently available. Unfortunately, the special metal halide lamps require special control and ignition conditions. Specifically, a voltage of 300 to 550 volts and a fast pulse of about 23 KV–30 KV are needed to ignite these lamps. Further, an operating voltage of about 65 V–120 V is needed. Currently available electronic control and ignition systems are complex and consequently, very expensive.

In the past, the operation of metal halide bulbs was electronically controlled with current control circuitry. With current control circuitry, a choke (i.e., an inductor or winding), located between a step-up converter and a switch network, supplies a rectangular AC current in conjunction with a lamp switch network. Transistors are switched in a phased mode, i.e., first on, second off. The inductive properties of the ignition transformer do not interfere with the current control circuitry. Unfortunately, the current control circuitry is very bulky, includes a high number of components, and is expensive.

In view of the above drawbacks of the prior art, a lamp (such as a portable, hand-held lamp, for example) having a high conversion efficiency, a reasonable service life, and a high light output (in lumen) is needed. The lamp must be able to reach full output in a short amount of time and must reliably restart under "hot conditions." To be commercially viable, the control and ignition systems of the lamp must be relatively inexpensive. Lastly, the lamp should be able to operate with a variety of power sources, such as a battery, a car or boat power supply, or an AC or DC power supply.

SUMMARY OF THE INVENTION

The present invention meets each of the above mentioned unfulfilled needs by providing a portable, equipment installed or hand-held, lamp having voltage control circuitry in which a lamp switch network is directly connected to a step-up converter. The step-up converter serves as the voltage source in conjunction with the lamp switch network. Transistors are switched in sequence (i.e., first off, second on) with short "dead time" (or "all off") periods of approximately 1 microsecond. The present invention has an optimized circuit design to minimize induction interference of the ignition transformer. The voltage control circuitry of the present invention advantageously has a very compact design, has a few number of components, and is cost effective.

The present invention provides a lamp assembly for use with a rapid start metal halide bulb, the lamp assembly having a lamp head housing and a power supply source. The lamp head housing includes a circuit board, power supply contact surfaces, a high voltage resistant socket, a reflector, and an on-off switch. The circuit board provides an ignition voltage, an ignition voltage spike, and a supply voltage to the rapid start metal halide bulb. The power supply contact surfaces are for connecting power to the circuit board. The high voltage resistant socket holds the rapid start metal halide bulb and is electrically coupled with the circuit board. The reflector is arranged relative to the high voltage resistant socket and reflects light emitted from the rapid start metal halide bulb. The on-off switch is electrically coupled with the circuit board. The power supply source provides a supply voltage to the lamp head and has contacts.

The power supply source may be mechanically coupled with the lamp head housing such that its contacts contact the power supply contact surfaces of the lamp head housing. Otherwise, the power supply source may be wire connected to the lamp head. The power supply source may be a battery package including a multi-pole connector having two battery charge lines. Alternatively, the power supply source may be an AC to DC converter including a transformer, a diode, and a capacitor. The power supply source may include a handle and a magnetic switch for actuating the reed relay on-off switch.

The circuit board includes a first planar side and a second planar side. The power supply contact surfaces can be arranged on the first planar side of the circuit board and the high voltage resistant socket can be arranged on the second planar side of the circuit board. The circuit board preferably includes an input voltage checking circuit, a measuring unit, a controlled voltage step up circuit, a lamp voltage polarity switching circuit, and a pulse supply circuit.

The input voltage checking circuit checks the input voltage and disconnects the input voltage if it is below a predetermined threshold. The input voltage checking circuit provides a pulse signal for pulsing the output of the lamp when an input voltage is below a second predetermined limit, thereby alerting a user of the lamp that the discharge limit of the battery is near.

The measuring unit measures a current flowing through the lamp.

The controlled voltage step up circuit determines when the rapid start metal halide bulb is operating and provides the ignition voltage when the rapid start metal halide bulb is not operating and provides a supply voltage after the rapid start metal halide bulb has been ignited. The controlled voltage step up circuit can include a center-tapped choke, a switch having a gate, a drain coupled with the tap of the center-tapped choke, and a source coupled with ground, a diode coupled in series with, and following, the center-tapped choke, a capacitor coupled in parallel with the switch, wherein the measuring unit is coupled between the capacitor and ground, a control integrated circuit for controlling a pulse train supplied to the gate of the switch, a first network for controlling a current input to the control integrated circuit so that at lower output voltages, the current is increased and at higher output voltages, the current is decreased, and a second network for permitting the capacitor to store enough charge to reach the ignition voltage. The choke can be bifilar.

The lamp voltage polarity switching circuit switches a polarity of the supply voltage applied to the lamp and includes a first switch having a gate, a drain, and a source coupled with a first terminal of the lamp, a second switch having a gate, a drain, and a source coupled with a second terminal of the lamp, a third switch having a gate, a source, and a drain coupled with the first terminal of the lamp, a fourth switch having a gate, a source, and a drain coupled with the second terminal of the lamp, a clock for supplying, via a delay element, a delayed clock signal to the gate of the fourth switch, and for supplying, via a delay element and an invertor, a delayed inverted clock signal to the gate of the third switch, and a high frequency oscillator for supplying a high frequency voltage to the gate of the first switch when the clock signal from the clock is high and for supplying a high frequency voltage to the gate of the second switch when the clock signal from the clock is low, whereby a high frequency voltage is applied to the lamp bulb in alternating terminals of the lamp.

The pulse supply circuit supplies the ignition voltage spike to the lamp.

The open lamp voltage is preferably from 300 volts to 550 volts. The lamp ignition voltage can be up to 1600 volts. The lamp operating voltage is preferably between 65 volts and 120 volts. The lamp operating voltage preferably has a normal value of approximately 85 volts. The ignition voltage spike is preferably a fast pulse of 23 to 30 kilovolts.

The on-off switch of the lamp head housing can be a reed relay.

The present invention also provides a portable lamp with current or voltage control circuitry including a metal halide light source, a reflector, a circuit board, a high voltage resistant socket, a housing and a front glass, and a power supply. The reflector may be arranged concentrically around the metal halide light source. The circuit board may include electronic control and ignition circuitry for controlling and igniting the metal halide light source. The ignition circuitry can provide an ignition voltage and an ignition pulse. The ignition voltage is preferably between 300 volts and 550 volts and the ignition pulse is preferably approximately 23 to 30 kilovolts. The high voltage resistant socket may be electrically coupled with the circuit board and may hold the metal halide light source. The housing and a front glass may define a cavity enclosing the metal halide light source, the reflector, the circuit board, and the high voltage resistant socket. The power supply may be electrically coupled to the circuit board.

The circuit board may be ring shaped or multiangular, for example.

The metal halide light source preferably has an operating power supply of up to 100 watts.

The metal halide light source may be operated with an AC-current controlled circuitry or with a DC-current controlled circuitry.

BRIEF DESCRIPTION OF THE DRAWINGS

FIG. 8 is a block diagram which illustrates the connectors of a printed circuit board.

FIG. 9 is a block diagram which illustrates the connectors of a battery pack.

FIG. 10 is a block diagram which illustrates the connectors of a supply adaptor.

DETAILED DESCRIPTION

Figure 1:
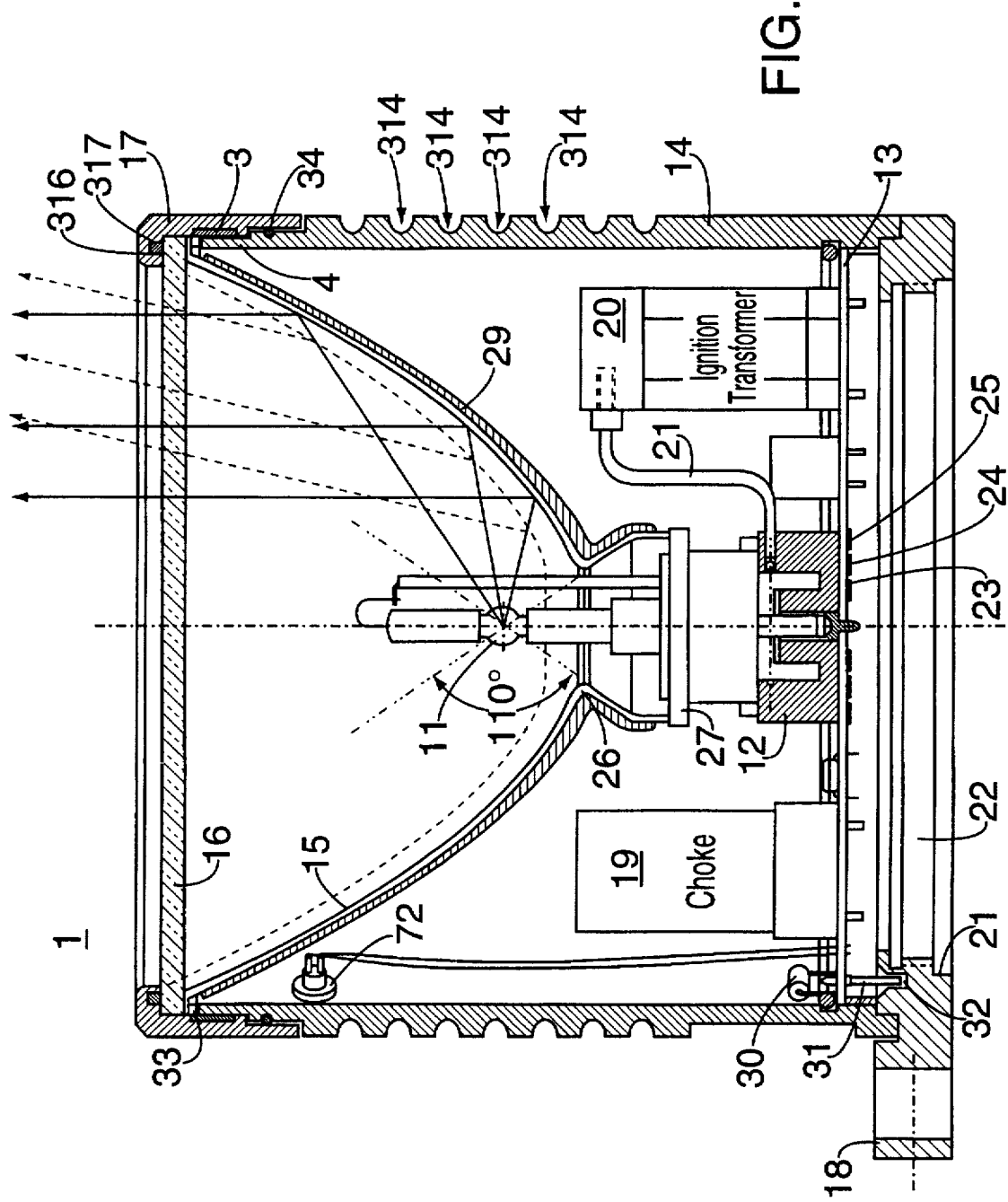
FIG. 1 is a partial cross-sectional side view which illustrates a lamp housing head of the present invention, having a parabolic reflector.
Figure 11:
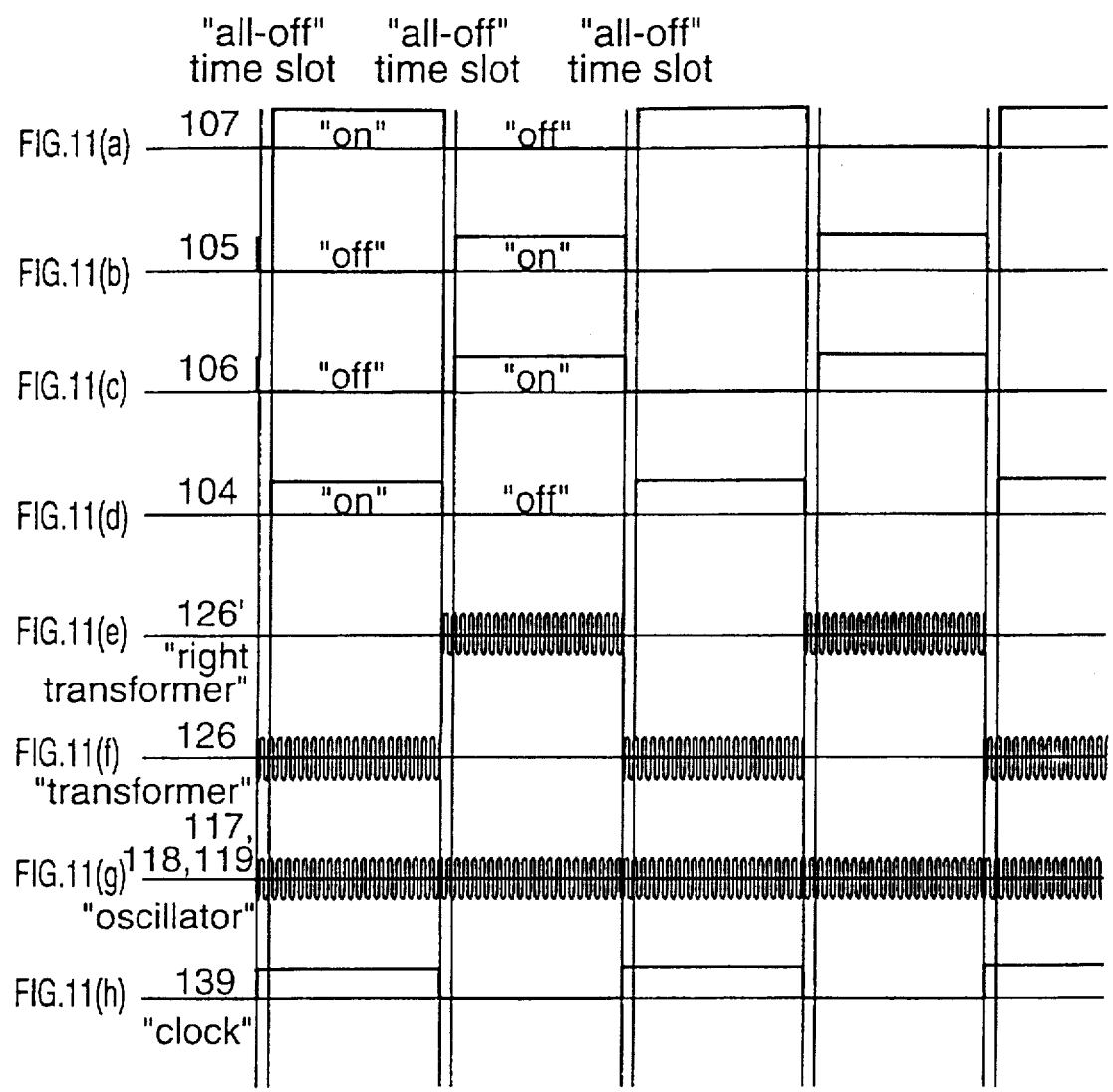
FIGS. 11(a) through 11(h) are timing diagrams which illustrate the operation of the electronic control of FIG. 7.

FIG. 1 is a partial cross-sectional side view which illustrates a lamp housing head 1, of the present invention, having a parabolic reflector 15. A high voltage resistant socket 12 holds a special metal halide light bulb 11, such as an ECE-D2 light bulb, for example. A printed circuit board 13 includes electronic components, including a choke 19 of a step-up converter and an ignition transformer 20, needed to ignite and operate the light bulb 11. The components of the printed circuit board 13 are described in detail below with reference to FIGS. 7 and 11. The high voltage side (or "hot" side) of the ignition transformer 20 is electrically coupled with the high voltage resistant socket 12 via a high voltage cable 21.

A reflector 15 (shown here as a parabolic reflector) is arranged around the light bulb 11. The reflector 15 is tapered in at its bottom 26 to minimize light loss. Insulation 29 is provided on the back of the reflector 15 to protect the electronic components of the circuit board 13 from heat generated by the light source 11. The reflector 15 rests against a base 27 of the socket 12.

A tube 14 houses the reflector 15, the insulator 29, the light source 11, the socket 12, the printed circuit board 13, the choke 19 and the ignition transformer 20. The tube 14 is provided with cooling vanes 314. A front glass 16 rests on an outside surface of the flange 33. The front glass 16 may be a lens, for example. A cylindrical ring cap 17 includes a radially inward extending lip 317 having an inside surface which bounds an outer peripheral region of an outside surface of the front glass 16. An inner wall of the cylindrical ring cap 17 is tapped such that threads 3 mesh with threads 4 on an outer surface of the tube 14. An O-Ring seal 34 provides a seal between the ring cap 17 and the tube 14.

Similarly, an O-Ring seal 316 provides a seal between the front glass 16 and the ring cap 17.

By turning the ring cap 17 with respect to the tube 14, the front glass 16, the reflector 15, and the insulator 29 can be moved up and down relative to the socket 12. For example, when the reflector 15 moves up (away) from the socket 12, the insulator 29 is lifted from the base surface 27 of the socket 12. (See dotted lines.) This permits the focal point of the light emitted from the lamp housing head 1 to be adjusted. For example, when the ring cap 17 is adjusted to a point closest to the printed circuit board 13 (i.e., such that the reflector 15 rests on the base surface 27 of the socket 12), the light emitted from the lamp housing head 1 is focused at a spot. When the ring cap 17 is adjusted to a point further from the printed circuit board (i.e., when the reflector 15 is above the base surface 27 of the socket 12), the light emitted from the lamp housing head 1 is dispersed.

When the ring cap 17 is adjusted, the lamp will remain water tight as long as the O-ring 34 remains properly arranged between the ring cap 17 and the tube 14. In an embodiment of the present invention for underwater operation, the front glass 16 and the tube housing 14 are appropriately designed in a known manner.

Figure 2:
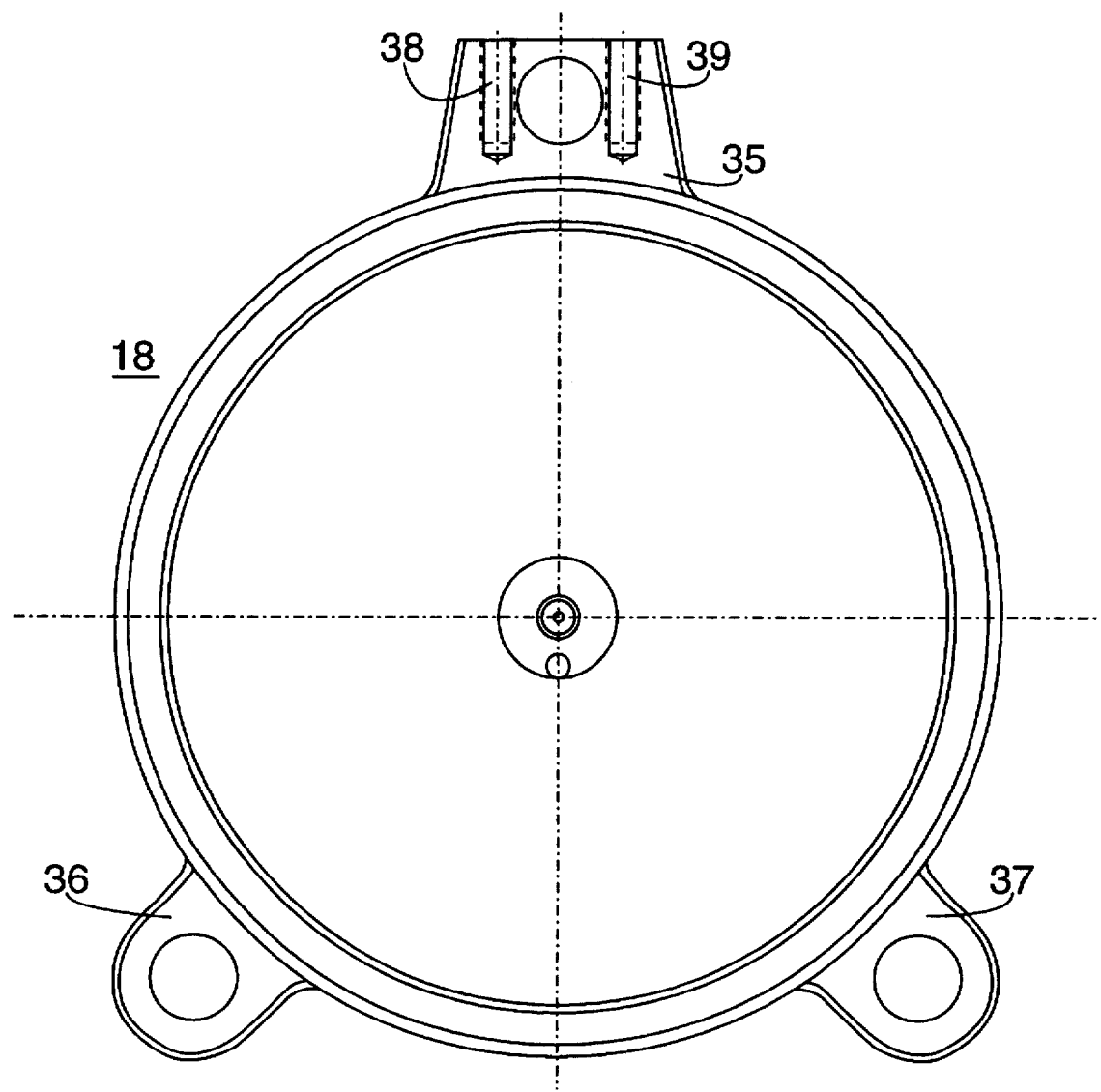
FIG. 2 is plan view which illustrates the lamp housing head of FIG. 1.

A flange collar 18 is attached to the tube 14 at an end opposite the ring cap 17. As shown in FIG. 2, the flange collar 18 includes three through extensions 35, 36, and 37, one of which 35 includes two tapped holes 38, 39. The through extensions 35, 36, 37 permit the lamp to be fastened to ports of vehicles, boats, video/film tripods, etc. The through extensions 35, 36, 37 also prevent the lamp from rolling. If the lamp is to be used as a hand held lamp, a handle 40 can be fastened to the through extension 35 by screws which go through the handle 40 and into the tapped holes 38 and 39. (See FIGS. 3 and 4.)

As shown in FIG. 1, the printed circuit board 13 includes a reed relay 30 and a pin 31. The pin 31 extends from a recess 32 in an upper side of the flange collar 18 and through a hole in the printed circuit board 13 thereby locking the printed circuit board 13 in a correct position for the magnetic switch. The flange collar 18 has an inner seal surface 21 for accommodating an O-Ring of a power supply counterpart (not shown). The power supply counterpart can be connected to the lamp housing head 22 with a "bayonet" friction fit or by screwing it on.

Contact surfaces 23, 24, and 25 are located at the bottom end side of the printed circuit board 13. The contact surfaces 23, 24, 25 provide electrical connections when the power supply counterpart is mechanically connected to the lamp housing head 1. In an embodiment of the present invention where the power supply counterpart may be screwed onto the lamp housing head 1, the three contact surfaces 23, 24, and 25 are ring shaped.

The lamp housing head 1 may also include a temperature switch 72 which is electrically coupled with the printed circuit board 13. The temperature switch 72 opens when the temperature in the lamp housing head 1 exceeds a predetermined maximum. For example, the temperature in the lamp housing could exceed the predetermined maximum if the lamp is accidentally switched on while in a carrying bag. The relationship of the temperature switch 72 with respect to other components of the printed circuit board 13 is described in more detail below with reference to FIG. 7.

Figure 3:
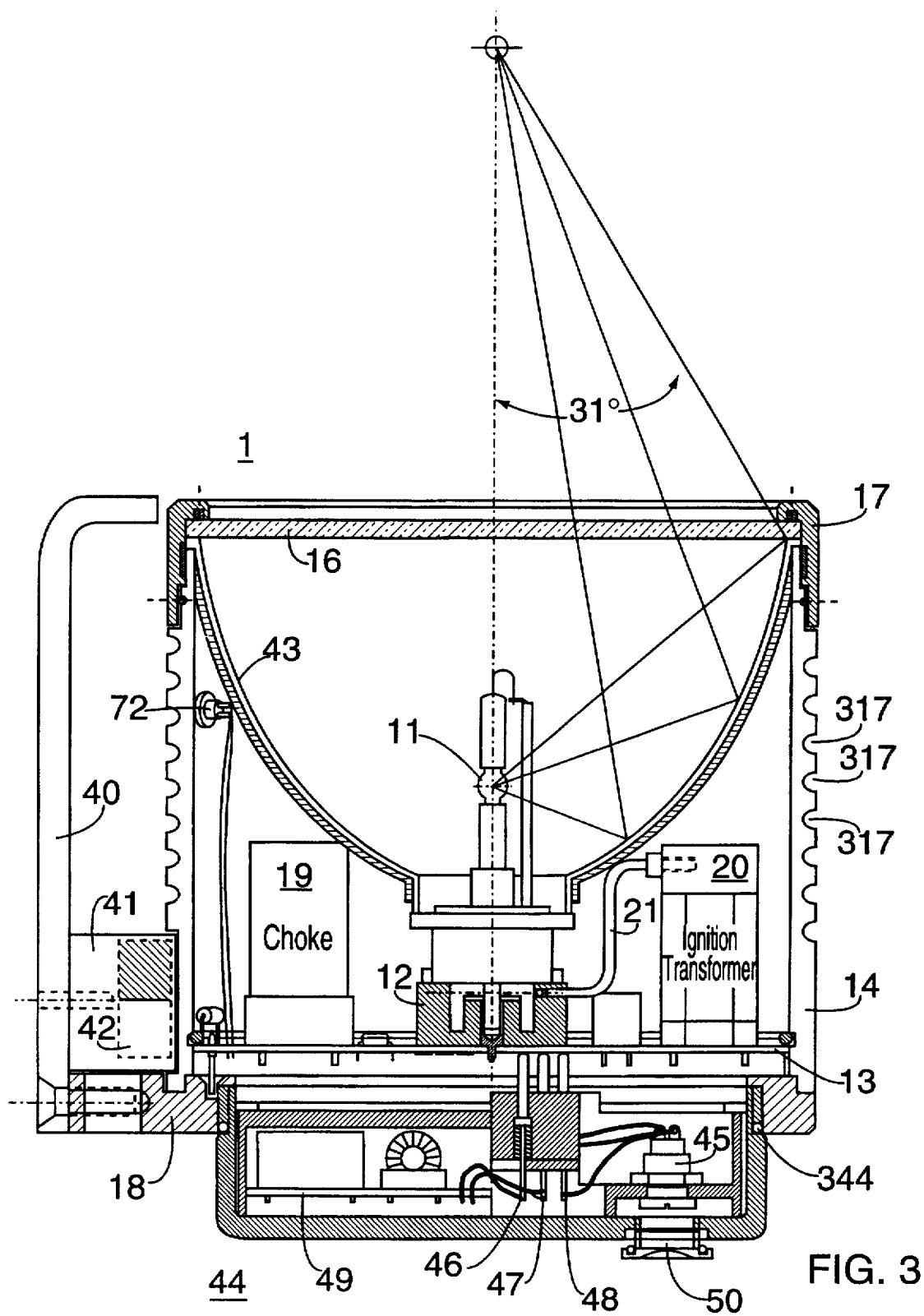
FIG. 3 is a partial cross-sectional side view which illustrates a lamp housing head of the present invention, having an elliptical reflector, and having an adaptor which permits the lamp to be connected to an external power supply.

FIG. 3 is a partial cross-sectional side view which illustrates a lamp housing head 1 of the present invention and an adaptor 44 which permits the lamp to be connected to an external power supply. In this embodiment, an elliptical reflector 43 is used in place of the parabolic reflector 15 of the embodiment illustrated in FIG. 1. The elliptical reflector 43 has a light beam focus angle of 62°.

A magnetic switch 41, including a magnet 42, is connected to a handle 40 which is fastened to the through extension 35 of the flange 18 as described above. The magnetic switch 41 is used to actuate the reed relay 30.

FIG. 3 also illustrates the adaptor 44 which may be fastened to the flange 18. An O-ring 344 may be provided to assure a water tight seal between the adaptor 44 and the flange 18. The adaptor 44 permits the lamp housing head to be connected to an external power supply (not shown). The adaptor 44 includes a connector 45 for providing a connection to the external power supply. The adaptor 44 also includes spring loaded contacts 46, 47, and 48 which transfer power to the printed circuit board 13 via contact surfaces 23, 24, and 25 (see FIG. 1.). The adaptor 44 may also include an RF filter (See FIG. 10.), a DC-DC converter, etc.

Figure 4:
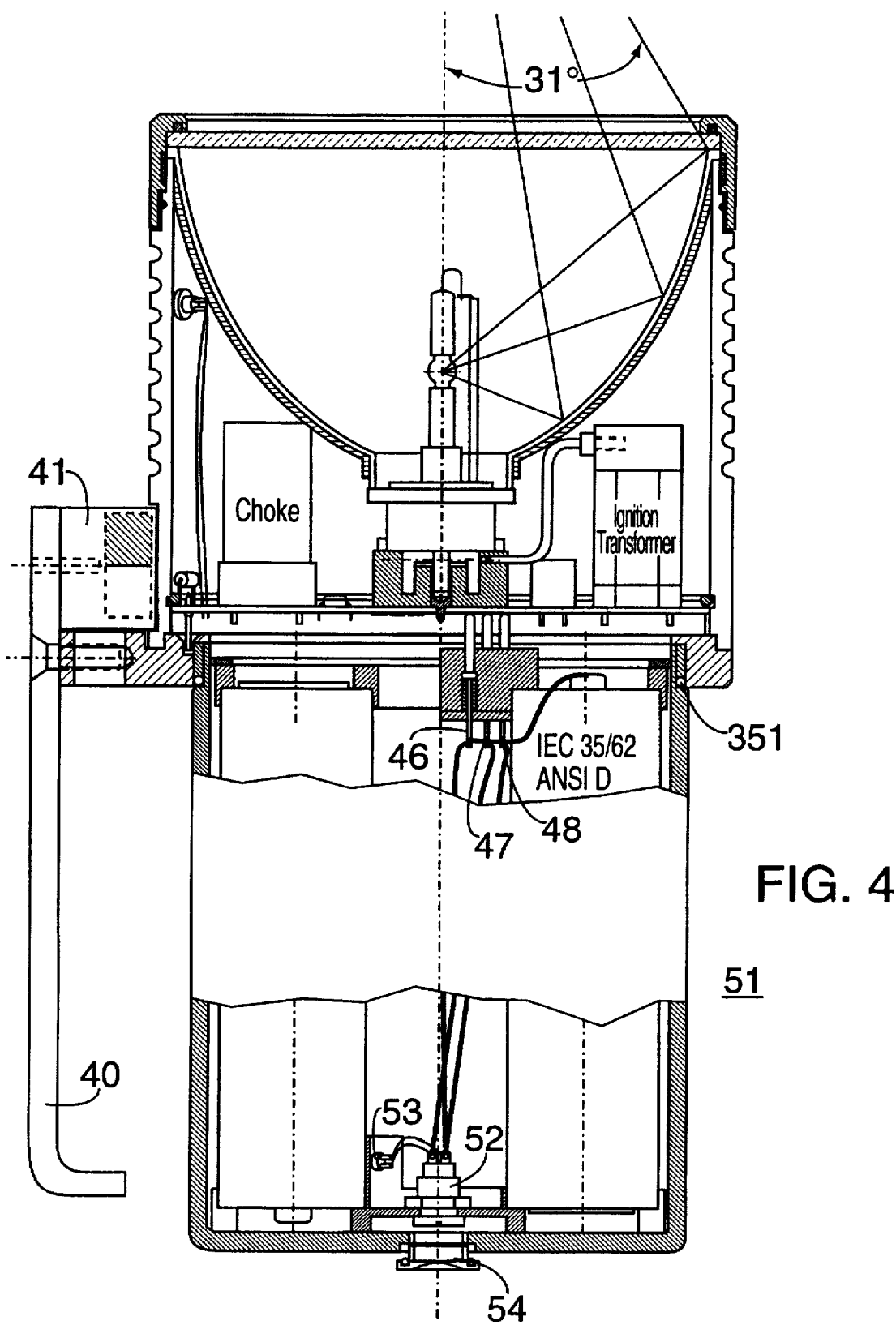
FIG. 4 is a partial cross-sectional side view which illustrates the lamp housing head of FIG. 3, a battery pack, and a handle.

FIG. 4 is a partial cross-sectional side view which illustrates the lamp housing head 1 of FIG. 3, a battery pack 51, and a handle 40. The battery pack 51 is fastened to the flange 18. The battery pack 51 may include twelve (12) standard Ni-Cad cells, for example. Similar to the adaptor 44 illustrated in FIG. 3, an O-ring 351 may be provided to seal the battery pack 51 and the flange 18. Similar to the adaptor 44 illustrated in FIG. 3, the battery pack 51 includes spring loaded contacts 46, 47, and 48 which transfer power to the printed circuit board 13 via contact surfaces 23, 24, and 25 (See FIG. 1.). The battery pack 51 may include a temperature sensor 53. The battery pack 51 also includes an electrical connector 52, such as a five pole electrical connector, for example. The electrical connector 52 permits two battery charge lines, two temperature sensor lines, and a remote line to be connected (See FIG. 9.). The electrical connector 52 can be made water tight with an O-Ring cap 54.

Figure 5:
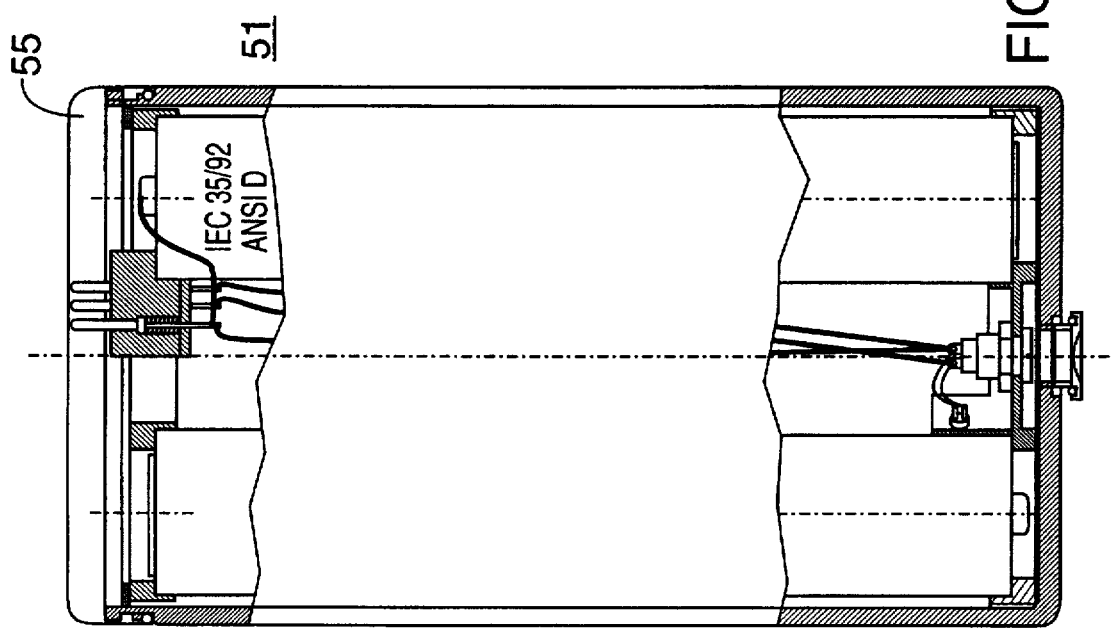
FIG. 5 is a partial cross-sectional side view of a battery pack with a cap.

Further, when a battery pack 51 is fastened to the flange 18, the center of gravity is changed from that of the embodiment shown in FIG. 3. As a consequence, the handle 40 is fastened to the through extension 35 of the flange 18 such that it extends over the battery pack 51. The magnetic switch 41 is still positioned adjacent to the reed relay 30. As shown in FIG. 5, a cap 55 may be used to protect the top of the battery pack 51 when not in use.

Figure 6:
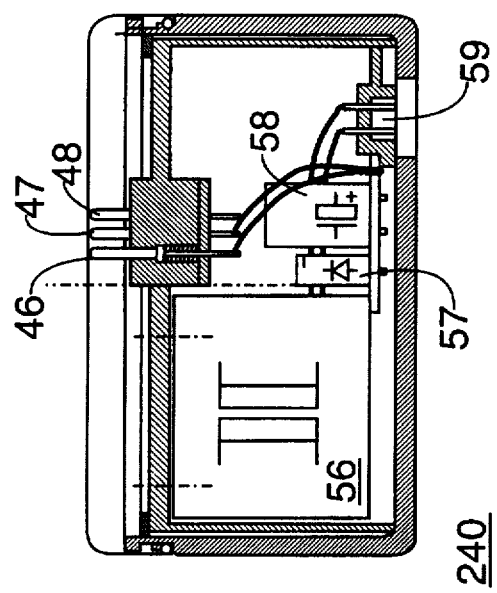
FIG. 6 is a partial cross-sectional side view of an A/C to D/C transformer.

FIG. 6 illustrates an AC to DC converter 240 that can be fastened to the lamp housing head 1. Similar to the adaptor 44 illustrated in FIG. 3 and the battery pack 51 illustrated in FIG. 4, the AC to DC converter 240 includes spring loaded contacts 46, 47, and 48 which transfer power to the printed circuit board 13 via contact surfaces 23, 24, and 25 (See FIG. 1.). A power connector 59 brings power from an AC outlet to the AC to DC converter 240. The AC to DC converter 240 includes elements for AC to DC conversion, i.e., a rectifier (diode) 57, a stabilizing capacitor 58 and a transformer 56.

Figure 7:
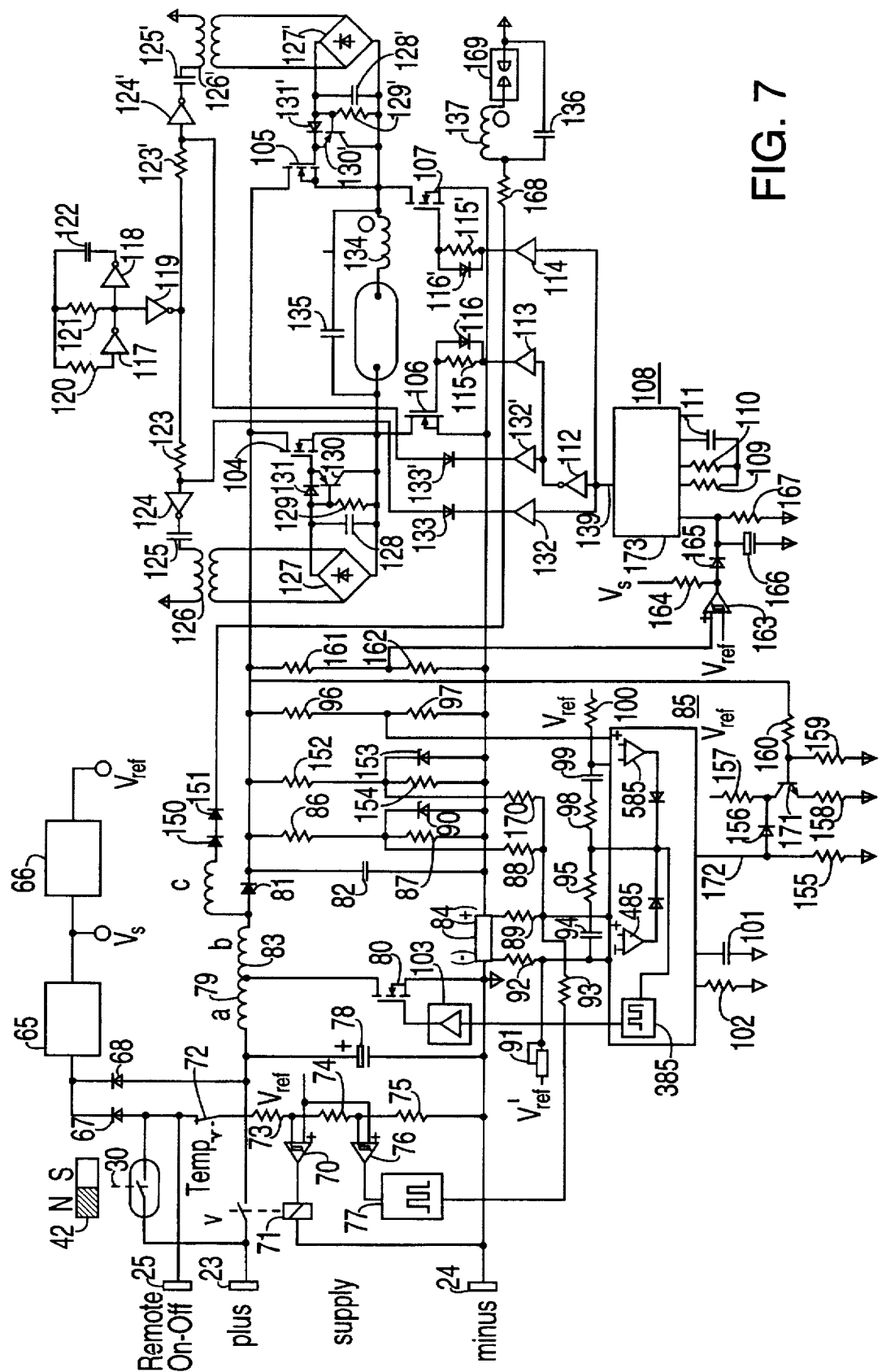
FIG. 7 is a schematic diagram of an electronic control, according to the present invention, for igniting and controlling the lamp.
Figure 12:
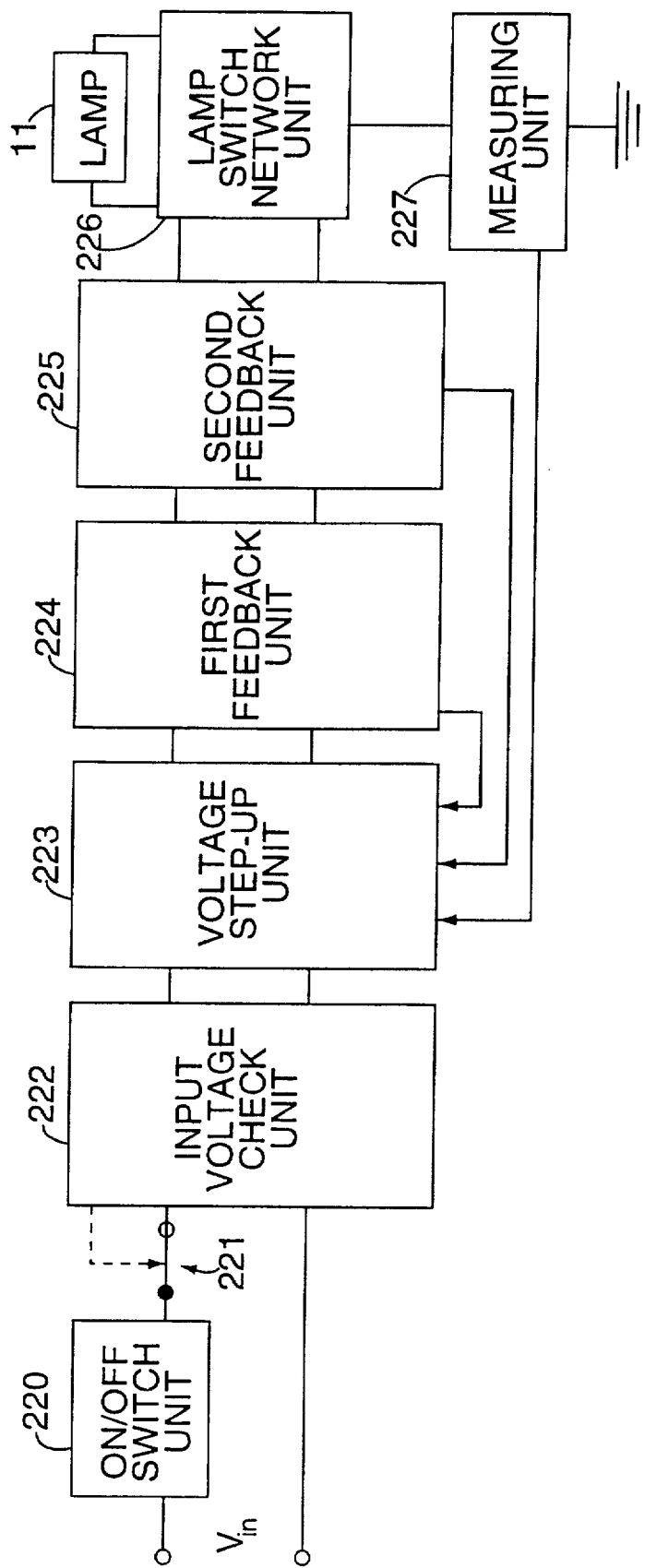
FIG. 12 is a functional block diagram of the circuit of FIG. 7.

FIG. 7 is a schematic diagram of an electronic control circuit, according to the present invention, for igniting and controlling the lamp. FIG. 12 is a functional block diagram of the electronic control circuit of the present invention. The electronic control circuit of the present invention has the following characteristics. First, the lamp bulb must be ignited with a voltage of about between 300 V and 550 V along with a fast pulse of about 23 KV–30 KV. Once the lamp bulb is ignited, it must be supplied with an operating voltage of between 65 V and 120 V, for example, and be supplied with a constant power, such as 35 watts, for example.

Moreover, the operating voltage supplied to the lamp bulb must be switched, for example at between 90 Hz and 500 Hz, so that gas separation due to migration is avoided. Specifically, if a DC voltage were to be applied to the lamp bulb, metal ions would "migrate" to the negative terminal while gas ions would "migrate" to the positive terminal, thereby causing gas separation. By alternating the polarity of the voltage applied to the lamp bulb, the gas and metal ions stay "mixed" and separation due to migration is avoided.

As illustrated in FIG. 12, a supply voltage $V_{in}$ is applied at a terminal of an on/off switch unit 220. The supply voltage is a DC voltage and can be supplied, for example, from a 12 V DC battery or a 12 V AC to DC transformer. When the on/off switch 220 is closed, the input voltage is measured and compared with a predetermined minimum voltage $V_{min}$ by means of the input voltage check unit 222. If the supply voltage is less than the predetermined minimum voltage $V_{min}$, the switch 221 is opened.

A physical implementation of the functional units 220–222 is shown in FIG. 7. Specifically, a supply voltage is applied across terminals 23 and 24. When a reed relay 30 closes after being actuated by a magnet 42, current flows from the positive terminal 23 and through the resistors 73, 74, and 75 to ground. The voltage at a node between resistors 73 and 74 ("the first node voltage") is compared with a reference minimum voltage $V_{ref}$ by a Schmitt-trigger comparator 70. If the first node voltage is greater than the reference minimum voltage $V_{ref}$, i.e., if the supply voltage is sufficiently high, the Schmitt-trigger comparator 70 activates the relay 71 to close the switch 200. However, if the comparator 70 determines that the first node voltage is less than the reference minimum voltage $V_{ref}$, the relay 71 is de-energized thus opening the switch 200. If the power is turned off, i.e., if the reed relay 30 is opened, current drains from the first node until the relay 71 opens. In this way, undefined operating conditions are eliminated.

As mentioned above, a temperature switch 72 is provided to turn off the lamp if the temperature in the lamp housing exceeds a predetermined maximum. As shown in FIG. 7, when the temperature switch 72 opens, the first node voltage will drop to below $V_{ref}$. Thus, the relay 71 will open switch 200 and the power supply will be disconnected.

The lamp of the present invention also indicates to a user when the battery is almost discharged. Specifically, a voltage at a node between resistors 74 and 75 ("the second node voltage") is compared with the reference voltage $V_{ref}$ by a Schmitt-trigger comparator 76. If the comparator 76 determines that the second node voltage is less than the reference voltage $V_{ref}$, a pulse generator 77 is enabled. The pulse generator 77 will modulate the brightness of the lamp at a predetermined interval (e.g., one second) thereby indicating to the user that the battery is almost discharged. Such an indication is very likely to be noticed quickly by the user, unlike an acoustic signal or another optical indicator (e.g., an LED). However, additional or alternative indicating means may be used.

As shown in FIG. 12, the supply voltage (e.g., 12 V) is stepped-up, by voltage step-up unit 223, to 85 V DC, for example, or to between 300 V to 550 V, for example. The voltage to which the supply voltage is stepped-up is controlled based upon a signal from a measurement unit 227, a measurement from a first feedback unit 224, and a measurement from a second feedback unit 225.

A physical implementation of the functional units 223, 224, 225, and 227 is shown in FIG. 7. Specifically, the step-up converter includes a choke 79 with two windings 79a and 79b, an electronic switch (e.g., a MOSFET) 80, a diode 81, and a capacitor 82. A shunt resistor 84, shown in the circuit of FIG. 7, corresponds to the functional measurement unit 227 of FIG. 12. An integrated circuit control (e.g., Motorola 34060) 85 and the shunt 84 maintain a constant output current, as long as the output voltage does not fall below the input voltage. The output voltage never falls below the input voltage because the output voltage at the lamp cannot fall below the supply voltage.

A network including resistors 86, 87, 88, and 89, and clamp (i.e., zener) diode 90 corresponds to the functional first feedback unit 224 of FIG. 12. The network acts as a current control input to the control integrated circuit 85 so that at lower output voltages, the current is increased and at higher output voltages, the current is decreased. A point on a current-voltage (i.e., I-V) curve is calibrated with potentiometer 91 and resistor 92.

A network including resistors 96, 97, 98, and 100, and capacitor 99 and an operational amplifier 585 (integrated into control circuit 85) permit the output voltage to be increased to between 300 V and 550 V, for example, prior to igniting the lighting source. In this case, the capacitor 82 (of 1–2 microfarad for example) accumulates enough energy to ignite the light source.

The choke 79 is tapped at its middle. A bifilar winding can be used to provide good coupling at both halves of the choke 79. This tapping reduces (e.g., by half) the required blocking voltage of the switch 80. This also reduces the flow through resistance of the electronic switch 80. Moreover, this tapping improves the intermittent (i.e., pulse-pause) characteristic of the output current, thereby decreasing ripples in the light source current. Furthermore, this tapping reduces (e.g., by half) the pulse current of the diode 81. When the switch 80 is open, the capacitor 82 receives charge. When the switch 80 is closed, the center tap of the choke 79 is coupled to ground and the diode 81 prevents the backflow of charge from the capacitor 82.

The opening and closing of the switch 80 is controlled, via a driver 103, by the control integrated circuit 85, which includes an oscillator 385. The frequency of the control IC oscillator 385 is controlled by resistor 102 and capacitor 101. The control IC oscillator 385 is controlled based upon a combination of the outputs of the operational amplifier 585 and an operational amplifier 485 of the IC controller 85. The operational amplifier 485 of the IC controller 85 compares a signal from two networks comprising elements 86–90 and 152–154 (at a node between resistors 88 and 89) with a point on an I-V curve defined by elements 91 and 92. The operational amplifier 585 of the IC controller 85 compares a voltage at a node between resistors 96 and 97, with a version of the reference voltage $V_{ref}$ stepped down by a network comprising elements 98–100. Thus, a voltage-current characteristic of FIG. 13 is provided at the output.

Upon ignition, the operating voltage of the lamp is low (approximately 20 V, for example) and will increase to 85 V, typically, as the lamp temperature increases. To achieve a short start-up period, a high current must be supplied (see e.g., region 1 of FIG. 13) which is rapidly reduced while the voltage increases to 65 V. The components 86, 87, 90, and 80 cause this, in conjunction with the current controller 485 until the Zener voltage of the diode 90 is reached (at the turning point of curve 1 of FIG. 13).

Figure 13:
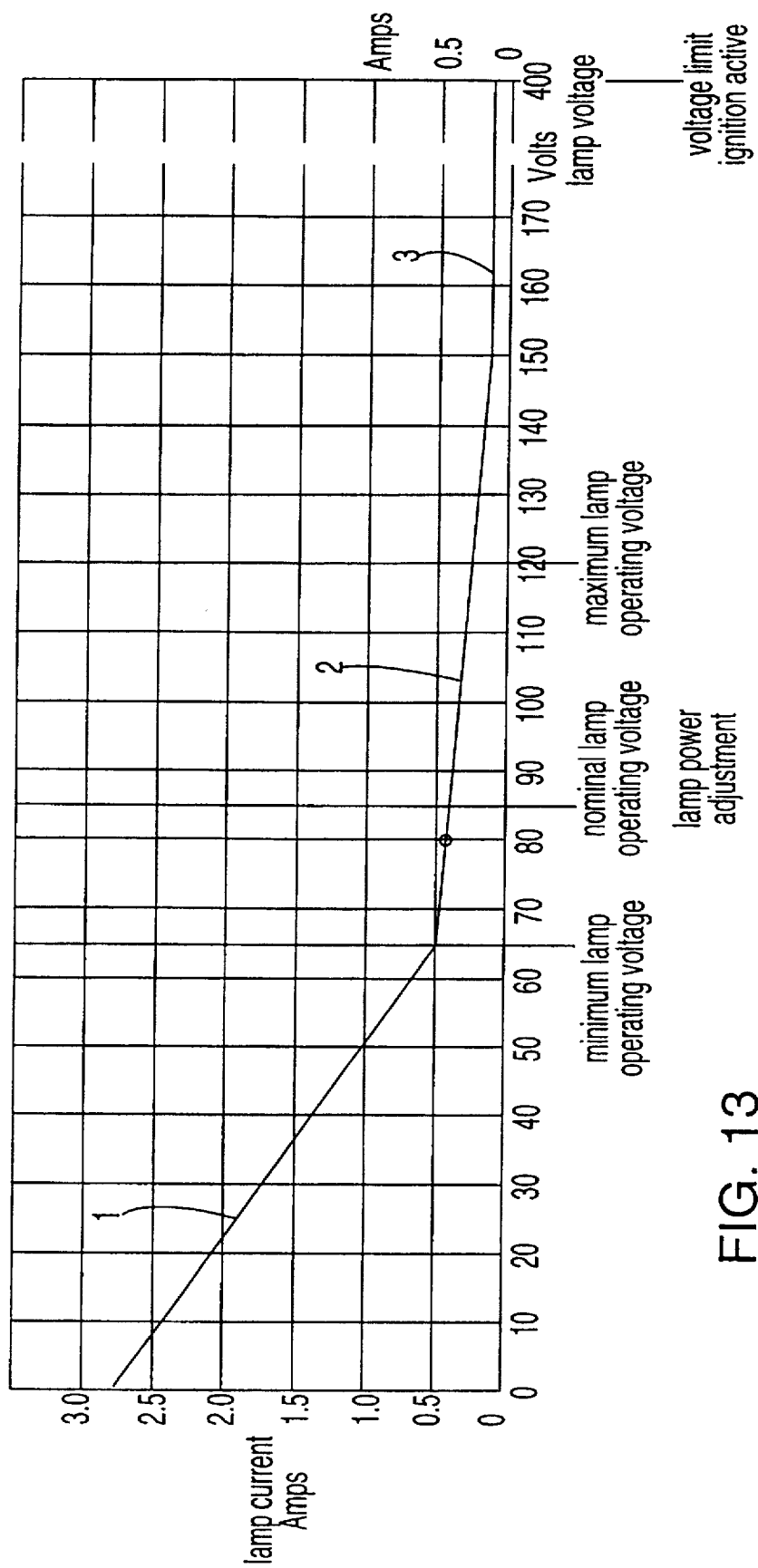
FIG. 13 is a current-voltage diagram of the power supply for the lamp.

Region 2 of FIG. 13 is approximated to the performance hyperbole of a 35 Watt metal halide bulb. The performance will be maintained relatively constant while the specific bulb value deviates or has changed due to aging. Region 2 of FIG. 13 is caused by components 152, 153, 154 and 170 and terminates at approximately 150 V when the Zener voltage of the diode 153 is reached. After region 2, the current remains constant until the voltage controller 585 senses 400 V as illustrated in region 3. Region 2 is adjustable by the potentiometer 91 to meet the required nominal power of the lamp.

The step up controller 85 operates over a wide range from approximately 12 V up to, typically, 400 V output. At 400 V, the operation is limited by the voltage control 585. In the voltage range below, the current control 485 is active and supplies an intrinsic current output, corresponding to the regions 1, 2, and 3 of FIG. 13.

The duty cycle of operation solely depends on the input/ output voltage ratio, not on the current. When a voltage of about 400 V is reached, a high duty cycle of about 95% is achieved. When the lamp is ignited, the voltage drops rapidly and requires a high current. (See FIG. 13). Whenever, the high duty cycle cannot adjust instantaneously, the choke 79 may become saturated. To avoid this, a network of components 155, 156, 157, 158, 159, 160, and 171 influences the step-up controller at the pin 172 "dead time control" to reduce the duty cycle rapidly and independently of the position of both controllers 485 and 585.

As illustrated in FIG. 12, the lamp bulb 11 bridges a lamp switch network unit 226. A physical implementation of the functional unit 226 is shown in FIG. 7. Specifically, the lamp 11 bridges two sets of switches (e.g., MOSFETS) 104–107. An oscillator 108 includes a clock output 139. The frequency of the clock 139 is determined by resistors 109 and 110, and capacitor 111. The clock 139 is illustrated in a timing diagram shown in FIG. 11(h). The clock output 139 controls the switch 106 (e.g., is applied to the gate of the MOSFET), via invertor 112, buffer 113, and delay element 115 and 116 as shown in FIG. 7 and in the timing diagram of FIG. 11(c). The delay in the OFF to ON switching of 106 relative to the clock 139 is due to the delay elements 115 and 116. This delay prevents switch shorting. The clock output 139 also controls the switch 107 (e.g., is applied to the gate of the MOSFET), via buffer 114 and delay element 115' and 116' as shown in FIGS. 11(h) and 11(a) in a manner similar to that described with respect to the switch 106 above.

The switches 104 and 105 are controlled by (e.g., the gates of the MOSFETs are provided with) a signal oscillating at about 400 KHz, for example. The oscillating signal is provided by an oscillator which includes invertors 117–119, resistors 120 and 121, and capacitor 122. The oscillating signal is provided to transformers 126, 126' via resistors 123, 123', invertors 124, 124', and capacitors 125, 125', respectively. The transformed signals are rectified by rectifiers 127, 127' and applied to switches 104, 105, via diodes 131, 131', respectively.

The high frequency signal at invertor 124 is switched on and off with the clock signal 139, via buffer 132 and diode 133, as illustrated in FIGS. 11(h) and 11(f). Similarly, the high frequency signal at invertor 124' is switched off and on with the clock signal 139, via invertor 112, buffer 132' and diode 133', as illustrated in FIGS. 11(h) and 11(e). As a result, a rectangular voltage of 90–500 Hz is applied across the lamp 11. (See, e.g., FIGS. 11(a), (d), (f) and FIGS. 11(b), (c), (e).)

As described above, a fast pulse of 20 KV, for example, is needed to ignite the lamp 11. The circuit of FIG. 7 provides this pulse as follows. The metal halide light bulb 11 (see FIG. 7) is voltage controlled because the capacitor 82 represents a low-impedance power source. Switching the transistors 104, 105, 106, 107 imposes a voltage in the series connection of the lamp bulb 11 and the secondary winding of the ignition transformer 134 (not a forced current). The time for changing the polarity of the current is determined by the induction value of the ignition transformer 134, 137.

To prevent the extinction of the light during the polarity change period, the induction value must be very low. This will be possible if a high voltage is generated in coil 79c and diodes 150, 151. The discharge of the capacitor 136 is obtained via gas discharge component 169.

The windings 137, 134 of the ignition transformer are arranged such that the ignition voltage and the operating voltage have the same polarity during the blocked rectangular switch-over period. Charge stored in capacitor 136 flows through the primary winding 137 which induces a voltage in the secondary winding 134. The capacitor 135 narrows (i.e., spikes) the voltage at the secondary thereby providing a fast pulse of high voltage (e.g., 20 KV) to the lamp 11.

The interfering induction of the ignition transformer can be eliminated if a winding of the ignition transformer is short circuited after ignition and before the start up of the rectangular generator 108. This can be achieved by a suitable mechanical or electronic switch.

Immediately after ignition, the metal halide bulb is very sensitive to polarity (±) voltage changes because the electrodes of the bulb are still relatively cold. The light can thereby be switched off and on and off again.

The comparator 163, in conjunction with components 164, 165, 166, 167, suppresses the rectangular voltage at pin 173 ("reset") until the operating voltage at 161, 162 has reached the steady state value of 65 to 120 V and the light bulb operation has stabilized.

FIG. 8 is a block diagram which illustrates the connectors of the printed circuit board 13. As discussed above with reference to FIG. 1, the printed circuit board 13 includes contacts 23, 24, and 25. Contacts 23 and 24 provide connections for the positive and negative terminals of the power supply. Contact 25 provides a connection for a remote on-off control.

FIG. 9 is a block diagram which illustrates battery pack 51 connectors corresponding to the connectors of the printed circuit board 13. The five pole electrical connector 52 described above with reference to FIG. 4 is depicted on the left side of FIG. 9. A line 48 can couple a first pole of the five pole electrical connector 52 with the remote on-off contact 25. Lines 46 and 47 can provide a supply voltage across the contacts 23 and 24 of the printed circuit board 13. A temperature sensor 53 is also provided.

FIG. 10 is a block diagram which illustrates the connectors of a supply adaptor 44. The supply adaptor 44 is described above with reference to FIG. 3. A line 48' can couple a first pole of an electrical connector 52' with the remote on-off contact 25 of the printed circuit board. Lines 46' and 47' can provide a supply voltage across the contacts 23 and 24 of the printed circuit board 13.

What is claimed is:

1. A lamp assembly for use with a rapid start metal halide bulb, the lamp assembly comprising:
   a) a lamp head housing including
      i) a circuit board for providing an ignition voltage, an ignition voltage spike, and a supply voltage to the rapid start metal halide bulb, the circuit board including:
         1. an input voltage checking circuit for checking an input voltage and for disconnecting the input voltage if the input voltage is below a predetermined threshold, the input voltage checking circuit generating a pulse signal for pulsing the output of the lamp when the input voltage is below a second predetermined limit thereby indicating that the discharge limit of the battery is near;
         2. a measuring unit for measuring current flowing through the lamp;
         3. a controlled voltage step up circuit for determining when the rapid start metal halide bulb is operating and for providing the ignition voltage when the rapid start metal halide bulb is not operating and for providing a supply voltage after the rapid start metal halide bulb has been ignited, the controlled voltage step up circuit being coupled to the measuring unit and generating the ignition and supply voltages in accordance with the current flowing through the lamp;
         4. a lamp voltage polarity switching circuit for switching a polarity of the supply voltage applied to the lamp; and
         5. a pulse supply circuit for supplying the ignition voltage spike to the lamp;
      ii) power supply contact surfaces for connecting power to the circuit board,
      iii) a high voltage resistant socket for holding the rapid start metal halide bulb, the high voltage resistant socket being electrically coupled with the circuit board,
      iv) a reflector arranged relative to the high voltage resistant socket, for reflecting light emitted from the rapid start metal halide bulb, and
      v) an on-off switch electrically coupled with the circuit board; and
   b) a power supply source, the power supply source providing a supply voltage to the lamp head and having contacts.

2. The lamp assembly of claim 1 wherein the power supply source is adapted to be mechanically coupled with the lamp head housing such that its contacts contact the power supply contact surfaces of the lamp head housing.

3. The lamp assembly of claim 1 wherein the power supply source is wire connected to the lamp head.

4. The lamp assembly of claim 1 wherein the circuit board includes a first planar side and a second planar side, the power supply contact surfaces are arranged on the first planar side of the circuit board and the high voltage resistant socket is arranged on the second planar side of the circuit board.

5. The lamp assembly of claim 1 wherein the on-off switch of the lamp head housing is a reed relay.

6. The lamp assembly of claim 1 wherein the power supply source is a battery package including a multipole connector having two battery charge lines.

7. The lamp assembly of claim 6 wherein the contacts of the battery package are spring loaded such that they contact the contacts of the lamp head housing.

8. The lamp assembly of claim 6 wherein the contacts of the battery package are wire connected to the contacts of the lamp head housing.

9. The lamp assembly of claim 1 wherein the power supply source is an AC to DC converter including a transformer, a diode, and a capacitor.

10. The lamp assembly of claim 9 wherein the contacts of the AC to DC converter are spring loaded such that they contact the contacts of the lamp head housing.

11. The lamp assembly of claim 9 wherein the contacts of the AC to DC converter are wire contacted to the contacts of the lamp head housing.

12. The lamp assembly of claim 5 wherein the power supply source includes:
   a magnetic switch for actuating the reed relay on-off switch; and
   a handle.

13. The lamp assembly of claim 1 wherein the controlled voltage step up circuit includes:
   a center-tapped choke;
   a switch having a gate, a drain coupled with the tap of the center-tapped choke, and a source coupled with ground;
   a diode coupled in series with, and following, the center-tapped choke;
   a capacitor coupled in parallel with the switch, wherein the measuring unit is coupled between the capacitor and ground;
   a control integrated circuit for controlling a pulse train supplied to the gate of the switch;
   a first network for controlling a current input to the control integrated circuit so that at lower output voltages, the current is increased and at higher output voltages, the current is decreased; and
   a second network for permitting the capacitor to store enough charge to reach the ignition voltage.

14. The lamp assembly of claim 13 wherein the choke is bifilar.

15. The lamp assembly of claim 1 wherein the lamp voltage polarity switching circuit includes:
   a first switch having a source coupled with a first terminal of the lamp, a gate and a drain;
   a second switch having a source coupled with a second terminal of the lamp, a gate and a drain;
   a third switch having a drain coupled with the first terminal of the lamp, a gate and a source;
   a fourth switch having a drain coupled with the second terminal of the lamp, a gate and a source;
   a clock for supplying, via a delay element, a delayed clock signal to the gate of the fourth switch, and for supplying, via a delay element and an invertor, a delayed inverted clock signal to the gate of the third switch; and
   a high frequency oscillator for supplying a high frequency voltage to the gate of the first switch when the clock signal from the clock is high and for supplying a high frequency voltage to the gate of the second switch when the clock signal from the clock is low, thereby applying a high frequency voltage to the lamp bulb in alternating terminals of the lamp.

16. The lamp assembly of claim 1 wherein the open lamp voltage is from 300 volts to 550 volts.

17. The lamp assembly of claim 1 wherein the lamp ignition voltage is up to 1600 volts.

18. The lamp assembly of claim 1 wherein the lamp operating voltage is between 65 volts and 120 volts.

19. The lamp assembly of claim 1 wherein the lamp operating voltage has a normal value of approximately 85 volts.

20. The lamp assembly of claim 1 wherein the ignition voltage spike is a fast pulse of 23 to 30 kilovolts.

21. A portable lamp with current or voltage control circuitry comprising:
   a) a metal halide light source;
   b) a reflector arranged concentrically around the metal halide light source;
   c) a circuit board including electronic control and ignition circuitry for controlling and igniting the metal halide light source, the circuitry including an input voltage checking circuit for checking the input voltage and for causing the output of the lamp to be pulsed if the input voltage is below a predetermined threshold;
   d) a high voltage resistant socket, electrically coupled with the circuit board and holding the metal halide light source;
   e) a housing and a front glass defining a cavity enclosing the metal halide light source, the reflector, the circuit board, and the high voltage resistant socket; and
   f) a power supply electrically coupled to the circuit board.

22. The portable lamp of claim 21 wherein the circuit board is ring shaped.

23. The portable lamp of claim 21 wherein the circuit board is multi-angular.

24. The portable lamp of claim 21 wherein the ignition circuitry provides an ignition voltage and an ignition pulse.

25. The portable lamp of claim 21 wherein the ignition voltage is between 300 volts and 550 volts and the ignition pulse is approximately 23 to 30 kilovolts.

26. The portable lamp of claim 21 wherein the metal halide light source has an operating power supply of up to 100 watts.

27. The portable lamp of claim 21 wherein the metal halide light source is operating with an AC-current controlled circuitry.

28. The portable lamp of claim 21 wherein the metal halide light source is operating with a DC-current controlled circuitry.

\* \* \* \* \*